United States Patent [19]

Scott

[11] 4,121,025

[45] Oct. 17, 1978

[54] POLYMER COMPOSITIONS

[76] Inventor: Gerald Scott, c/o The University of Aston in Birmingham, Gosta Green, Birmingham 4, England

[21] Appl. No.: 164,462

[22] Filed: Jul. 20, 1971

[30] Foreign Application Priority Data

Jul. 22, 1970 [GB] United Kingdom ............... 35546/70
May 3, 1971 [GB] United Kingdom ............... 12826/71

[51] Int. Cl.$^2$ .............................................. C08J 3/20
[52] U.S. Cl. ............................ 526/4; 260/45.75 G;
260/45.75 M; 260/45.75 P; 260/45.75 R;
260/45.85 N; 260/45.8 N; 260/45.95 H;
260/45.95 R; 260/DIG. 43; 528/485
[58] Field of Search ................ 260/DIG. 43, 45.75 R,
260/45.8 SN, 45.8 N, 45.95 H, 45.95 R, 45.75
M, 45.75 P, 45.75 G; 526/4; 528/485

[56] References Cited

U.S. PATENT DOCUMENTS

| 2,765,292 | 10/1956 | Groff et al. ................... 260/45.75 R |
| 2,789,962 | 4/1957 | Groff et al. ................... 260/45.75 R |
| 3,143,536 | 8/1964 | Guzzetta et al. ............. 260/DIG. 43 |
| 3,218,293 | 11/1965 | Geigle .......................... 260/45 .75 R |
| 3,318,841 | 5/1967 | Tomlinson et al. ........... 260/45.75 R |
| 3,326,832 | 6/1967 | Rauschembach et al. ... 260/45.75 C |
| 3,349,018 | 10/1967 | Potts ............................. 260/DIG. 43 |
| 3,395,198 | 7/1968 | Taniguchi et al. ........... 260/DIG. 43 |
| 3,454,510 | 7/1969 | Newland et al. ....................... 260/23 |
| 3,549,572 | 12/1970 | Minagawa et al. .................... 260/23 |
| 3,563,848 | 2/1971 | Bhakuni et al. .............. 260/45.75 R |
| 3,676,401 | 7/1972 | Henry ..................................... 260/63 |
| 3,825,627 | 7/1974 | McGaugh .................... 260/DIG. 43 |

FOREIGN PATENT DOCUMENTS

| 1,268,337 | 6/1961 | France ................................. 260/45.75 |
| 1,128,793 | 10/1968 | United Kingdom ................. 260/45.75 |

OTHER PUBLICATIONS

Waters, Mechanisms of Oxidation of Organic Compounds, Wiley & Sons, Inc. pp. 6–14.

*Primary Examiner*—Eugene C. Rzucidlo
*Attorney, Agent, or Firm*—Fleit & Jacobson

[57] ABSTRACT

The invention provides means for controlling the degradation of vinyl polymers by incorporating therein at least one non-ionic organo-soluble complex of a metal having an atomic number from 22 to 29, 40 to 47 or 57 to 79, the complex being activatable by light and optionally heat to give a more photo-oxidatively active form of the said metal, in an amount such as to cause degradation of the polymer at the end of the desired life of the composition.

14 Claims, No Drawings

POLYMER COMPOSITIONS

This invention relates to thermoplastic polymer compositions.

Thermoplastic polymers are widely used for packaging purposes, and they have many advantages for this purpose. However, when exposed to light and air out of doors, thermoplastic polymers in general take a long time to break down. This means that when packaging material made of a thermoplastic polymer is casually disposed of, it is liable to remain substantially unaltered for months or even years before it disappears. In this respect, thermoplastic polymers have less satisfactory properties than more conventional packaging materials such as those based on cellulose which degrade fairly rapidly when exposed out of doors to the action of the environment.

The present invention provides thermoplastic polymer compositions which degrade relatively rapidly on exposure to the environment. The compositions of the present invention comprise a thermoplastic vinyl polymer or copolymer (i.e. a polymer of at least one monomer containing one or more $>C=CH_2$ groups) and at least one non-ionic organo-soluble complex (as hereinafter defined) of a metal having an atomic number from 22 to 29, 40 to 47, or 57 to 79, the said complex being activatable by light and optionally heat to give a more photo-oxidatively active form of the said metal in an amount such as to cause degradation of the polymer at the end of the desired life of the composition.

By a "complex" as used herein is meant not only a complex which is a stable entity in the free state but also a complex which is not stable in the free state but is present in situ in the composition.

The desired life of the composition does, of course, depend on the use to which it is to be put. Thus in the case of plastics bottles, for instance, the composition should be such as will degrade quite soon after it has been disposed of. With a mulching film, on the other hand a much longer life is desired before the composition degrades. Thus, in general, the desired life of the composition will vary, depending on its end-use, from the order of a few weeks to a year or more.

When such compositions are exposed to light of the specified wavelength the complex which they contain is broken down with the liberation of a more photo-oxidatively active form of the metal and the latter catalyses the degradation of the polymer under the influence of light and air (i.e. oxygen). However, such complexes are relatively inert under the relatively high temperature conditions under which thermoplastic polymers are ordinarily fabricated, and indeed some of them may actually be antioxidants, so that the degradation is not promoted until and unless the polymer is exposed to light and air. Moreover, since window glass is substantially opaque in the range 270 to 330 nm, by selecting complexes which absorb preferentially in this region, in practice the degradation is only promoted when the polymer is exposed to light out of doors. Thus the thermoplastic polymer compositions of the present invention can be fabricated in the same way as known thermoplastic polymers without appreciable degradation during processing, and they have good stability indoors, but they are relatively rapidly degraded out of doors in the presence of light and air.

I have also found that once photodegradation has commenced as a result of the destruction of the complex by the ultra-violet light, then rapid oxidative degradation of the plastics material continues even if the source of light is removed. This means that the plastics article can be buried and it will continue to disintegrate so long as there is a small amount of oxygen present such as is normally to be found in rubbish tips and in land-fill deposits. This has a very important influence upon the behaviour of plastics buried in rubbish tips or left lying in the open, since bacteria do not normally attack plastics unless they are broken down to very small particle size, or, alternatively, unless they are chemically modified to make them more readily wetted by water which is the medium for the bacteria. The photo-initiated oxidation brings about both of these desirable results. Thus the work of breaking down the plastics material and reducing it eventually to the form of useful composting material, as with cellulose, is performed by the micro-organisms, once the accelerated oxidation has fulfilled its function. A similar process would also take place with polymeric products which are to be found increasingly in sewage systems, some means being provided for exposing the plastics content of the sewage to ultra-violet light. This might be done for example by exposing it to an artificial source of ultra-violet light, which could advantagously include the more energetic, shorter wavelengths not normally found in the sun's spectrum.

The complexes can thus be introduced into the polymer in known manner by blending, kneading or milling, for example. I have found that, in general, the complex can be introduced into the polymer without interfering with the latter's melt stability. Furthermore the complex may be formed in the polymer by adding an organic soluble form of the metal ion together with the complexing agent (preferably the latter is added first). The complexing agent acts as an inhibitor for the high temperature, metal ion catalysed oxidation of the polymer which occurs under processing conditions and is one of the several classes of antioxidant whose mechanisms are well known. (See, for example, my "Atmospheric Oxidation and Antioxidants" Elsevier, 1965, chapters 4 and 5). The complexing agents may also display other kinds of antioxidant activity; for example, phenols and arylamines and, particularly, polyfunctional phenols and arylamines have the ability to restrain oxidation both by complexing with metal ions and also by interfering with the oxidation chain reaction. Similarly, thiols, dithiocarbamates, dithiophosphates and xanthates not only complex with transition metals but the metal complexes also act as antioxidants by decomposing hydroperoxides under processing conditions. It is not always clear which of the antioxidant mechanisms are the more important and the agents are therefore designated restraining agents. One skilled in the art will realise what substances are likely to be restraining agents and it is sometimes advantageous to use two different kinds of restraining agent together (for example, a sulphur-containing complexing agent and a bis- or polyphenol) to achieve maximum stabilising effect in the polymer melt.

The thermoplastic compositions of this invention may contain other compounding ingredients, such as blowing agents antioxidants, stabilisers, lubricants, antistatic agents and anti-blocking agents, and some of these may have an additional restraining effect during the processing operation, or they may alter the ultra-violet stability of the polymer when compounded with the photoactivator. I have found that it is generally more convenient to start with unstabilised polymers (i.e. polymers not containing antioxidants or stabilisers) whenever possible in order to optimise polymer stability during processing and to minimise polymer stability during subsequent ultra-violet exposure. However, with every commercial thermoplastic polymer examined, including those stabilised with relatively large amounts of antioxidants and stabilisers, the metal complexes used in this invention have been found to act as photoactivators.

The thermoplastic vinyl polymer is preferably a film or fibre-forming polymer or copolymer such as polyethylene, polypropylene, poly(4-methyl-1-pentene), or polystyrene. Other vinyl polymers such as polyvinyl acetate, polyvinyl chloride, polymethyl methacrylate, and polyacrylonitrile and their copolymers including graft copolymers with unsaturated polymers, as well as mixtures of such polymers, particularly with unsaturated polymers, can also be used in the compositions of the present invention.

The metal present in the complexes used in the new compositions is preferably iron, but other metals which, in ionic form, catalyse the degradation of the said thermoplastic polymers can also be used, for example, cobalt, nickel, copper, manganese, silver, palladium, molybdenum, chromium, tungsten and cerium.

Some of these metals form complexes which themselves have an ultra-violet stabilising effect on thermoplastic polymers, for example, the planar complexes of cobalt and nickel, especially the latter. However, where such stabilising complexes are decomposed by light of the specified wavelength to produce metal ions, the latter then begin to catalyse the degradation of the thermoplastic polymer, so that thermoplastic compositions in accordance with the present invention containing such stabilising complexes initially have a lower rate of degradation than the thermoplastic polymer by itself, but this rate of degradation increases as the metal complex is decomposed and is finally greater than that of the thermoplastic polymer itself. This means that in order that the desired degree of degradation of the thermoplastic polymer shall be achieved within a reasonably short time, it is necessary to set a maximum limit on the proportion of metal complex which is included in the composition. This maximum proportion, which can usefully be included in the compositions of the invention of such "stabilising complexes" is 0.00001 mole of metal per 100 grams of thermoplastic polymer, i.e. about 0.012% by weight of complex.

For metal complexes which are not normally regarded as light stabilisers the maximum proportion is much higher, but it is rarely desirable to include more than about 0.05 up to 0.09 or 0.1% by weight of complex in such cases.

Very small amounts of complex have proved to be effective; however, in general, at least 0.001% by weight of complex should be present.

The amounts quoted above are the amounts of complex which should be present in the processed polymer, i.e. after the polymer has been mixed with the complex and any additives conventionally employed introduced. In fact, I have found that the duration of the processing, and, to a lesser extent, the mode of processing have an important bearing on the amount of complex finally present in the polymer. It should be stressed, however, that the important factor is the amount of metal complex *finally* present. I have found that, in fact, the amount of complex present in the polymer decreases with increasing processing time. Thus it is possible to introduce into the polymer amounts in excess of those quoted above; during the processing the complex starts to break down in the process of acting as an antioxidant. The amount of complex in the polymer at any given time can often be judged visually by the colour change, which should finally be no more than a pale colour, pale yellow in the case of the iron dithiocarbamates. This has been measured spectrophotometrically in all cases examined (including those given in the Examples which follow) to be within the preferred concentration range. In the case of the phenolic restraining agents, for example, the equilibrium between free metal ion and complex is well on the side of the free metal ion and hence the concentration of metal complex is normally very much lower than 0.1%. Nevertheless, the bis and polyphenols, particularly the 2,2'-methylene bis phenols and 2,2'-phenol sulphides are effective restrainers. With certain polymers, such as polyethylene, there are advantages in starting with a higher metal concentration because this generally gives rise to a more rapid ultra-violet degradation subsequently but, of course, the fabricated polymer should contain no more than the upper limits of complex given above. With such a polymer I have found, that best results can be achieved by using high processing temperatures and/or long processing times and/or good oxygen access during the processing, as for example when the polymer is milled in air on an open mill rather than in a conventional extrusion type blender. Another way of achieving the same effect which is, in some cases, economically advantageous is to use a stoichiometric excess of soluble metal (as aforesaid) salt with a restraining agent. In general, and up to a metal ion concentration in the region of 1%, the more metal ion present, the faster is the rate of U.V. degradation, so long as the concentration of the complex is less than 0.1%. In those cases where the restraining agent is also an antioxidant, (e.g. many of the sulphur-containing complexing agents, or aromatic amines and phenols) or where the transition metal forms a metal complex which is itself a powerful "peroxide decomposing" antioxidant, this improves the melt stability of the polymer. These are therefore to be preferred over restraining agents and complexes which do not possess this advantage since they lead to a highly active photoactivating system. Generally processing times of the order of 2 to 15 minutes (residence of complex) are suitable. The processing temperature does, of course, depend on the type of polymer being used but is generally from 130° to 220° C. The processing temperature is normally that used in the absence of a photoactivator when preformed metal complexes are used, concentrations as high as about 0.001 g. atoms of metal per 100 g. of polymer may be used but normally to achieve economic processing times, 0.0001 g. atom/100 g. are usually sufficient. The optimum effect with relatively short processing times is normally achieved with amounts from 0.00008 to 0.000001 g. atoms/100 g. of polymer.

I have also discovered that the environmental lifetime can sometimes be reduced if mixtures of different metal complexes are used since some such mixtures react synergistically. Thus, for example, a mixture of 0.005% of zinc dibutylthiocarbamate and 0.005% of iron dibutylthiocarbamate, based on the weight of polymer, provides a faster rate of degradation than 0.01% of either component.

Any suitable organic complexing agent can be used, providing that the resultant complex is degradable by light of the desired wavelength. The ligand atoms may be, for example, nitrogen, sulphur, oxygen, or phosphorus. Sulphur is preferred.

The complexing agents which can be used in the complexes may, in general, contain any one or more of the following complexing radicals: —N<; >NO—; >N—N<; —O—; —S—; >CO; >CS; —CO—O—; —CO—S—; —CS—O—; —CS—S—; —CO—N<; —CS—N<; —C≡N; >C=N—; >C=N—O—; —N=N—; >C=N—N<;

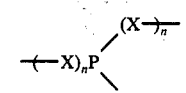
where X is —N— or —S— and n is 0 to 3 or X is —O— and n is 0 or 1.

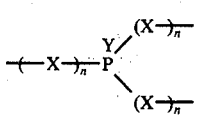
where Y is O or S, and X and n are as hereinbefore defined.

The free valencies of such radicals may be satisfied by hydrogen or an organic radical, e.g. alkyl, alkenyl, aralkyl, aralkenyl, or aryl, which may be substituted or unsubstituted. The radicals may also form part of a polymer chain, either by constituting part of the backbone of the polymer or by being attached thereto in a side chain. It is also possible for such organic radicals to be linked together to form cyclic structures, carbocyclic or heterocyclic, containing one or more such radicals. The free valencies of the complexing radicals may also be satisfied by silane or siloxane radicals, which may or may not be polymeric.

Generally the spacing of such radicals is such that the metal atom complexed forms with two such radicals and the atoms linking them, a ring containing at least four, and generally five, six or seven atoms.

When the radicals form part of a polymeric chain, each polymer molecule may contain several such radicals so that more than one metal atom may be complexed by each polymer molecule.

Examples of complexing agents containing such radicals are mono- and polyamines, oximes, alcohols, thiols, phenols, thiophenols, phosphoric, phosphonic and phosphorous esters and amides and their thio-analogues, ketones, thioketones, carboxylic acids, esters and amides and their thio-analogues, hydrazines, hydrazones, Schiff's bases, and azo compounds, e.g. the compounds of the formulae:

(a) $R_1R_2N—R_3$, in which $R_1$, $R_2$ and $R_3$ each represent hydrogen or a substituted or unsubstituted alkyl, alkenyl, aralkyl, aralkenyl, or aryl group and $R_3$ may also represent —$OR_1$ or —$NR_1R_2$, any two or three of $R_1$, $R_2$ and $R_3$ being optionally linked together;

(b) RSH and ROH, in which R represents a substituted or unsubstituted alkyl, alkenyl, aralkyl, aralkenyl, or aryl group;

(c) $(R_1O)(R_2O)P(OR_4)$, $(R_1O)(R_2O)\overset{O}{\overset{\|}{P}}(OR_4)$ and their thio-analogues, in which $R_1$, $R_2$ and $R_4$ each represent hydrogen or a substituted or unsubstituted alkyl, alkenyl, aralkyl, aralkenyl, or aryl group;

(d) $R_1R_2CO$, $R_1R_2CS$, and $R_1R_2C=N—R_4$ in which $R_1R_2$ and $R_4$ each represent a substituted or unsubstituted alkyl, alkenyl, aralkyl, aralkenyl, or aryl group, $R_1$ and $R_2$ being optionally linked together, and one of $R_1$ and $R_2$ and $R_4$ may in addition represent hydrogen;

(e) $R_1COOR_4$, $R_1CONR_4R_5$, and $R_1R_2C=NOR_4$ and their thio-analogues, in which each of $R_1$, $R_2$, $R_4$ and $R_5$ is hydrogen, or a substituted or unsubstituted alkyl, alkenyl, aralkyl, aralkenyl, or aryl group, $R_1$ and $R_2$ and/or $R_4$ and $R_5$ being optionally linked together. Included in this group are:

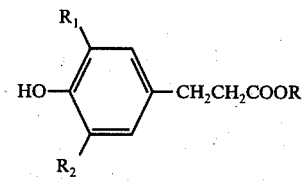
and
$(ROCOCH_2CH_2)_2S$; and (f) $R_1—N=N—R_2$, $R_1—C≡N$ and $R_1R_2C=N—NR_4R_5$ in which each of $R_1$, $R_2$, $R_4$ and $R_5$ is substituted or unsubstituted alkyl, alkenyl, aralkyl, aralkenyl, or aryl, $R_4$ and $R_5$ may in addition represent hydrogen, and $R_1$ and $R_2$ and/or $R_4$ and $R_5$ may be optionally linked together.

The metal complexes of the following complexing agents (which, however, do not necessarily exist in the free state) may be used in the compositions of the present invention:

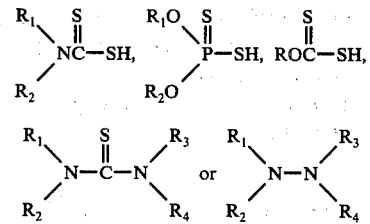

where R, $R_1$, $R_2$, $R_3$ and $R_4$ each represent hydrogen or an alkyl, aralkyl or aryl group or a substituted alkyl, aralkyl or aryl group, which may be linked together to form, with the nitrogen atom shown, a heterocyclic ring such as diisopropylthiophosphoryl monosulphide, diisopropylthiophosphoryl disulphide, trimethylthiourea and tetramethylthiuran disulphide;

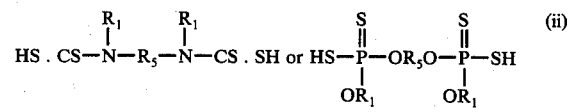

where $R_1$ is hydrogen, or an alkyl, aralkyl, or aryl group, or a substituted alkyl, aralkyl or aryl group, and $R_5$ is a divalent aliphatic, e.g. alkylene, aromatic, e.g. phenylene, or heterocyclic radical which may be polymeric;

$R_2CO(CH_2)_nCOR_2$ (n = 0-3) or (iii)
$R_2NHCO(CH_2)_{n_1}CONHR_2$ ($n_1$ = 0-18)

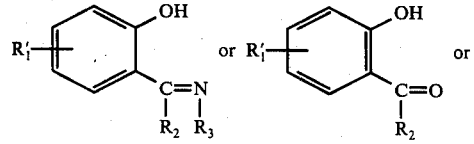

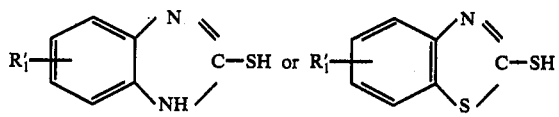

where $R_1'$ represents an alkyl, substituted alkyl, hydroxy or chloro group, or an alkylene radical linking two such aromatic groups, $R_2$ represents hydrogen, or an alkyl or aryl group or substituted alkyl or aryl group, $R_3$ represents a hydroxy, alkoxy, alkyl or substituted alkyl group including an ethylene or propylene bridge linking two such aromatic groups such as acetyl acetone, salicylaldehyde, di(salicylidene) ethylene diamine, 4-methyl-2-hydroxy-acetophenone oxime, mercaptobenzthiazole and mercaptobenzimidazole;

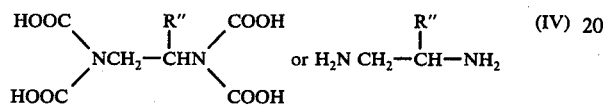

where R″ represents hydrogen or an alkyl group, or an x-valent radical, which may be polymeric, linking x such complexing groups such as ethylene diamine and ethylene diamine tetra-acetic acid;

(v) aromatic amines, conventionally used as antioxidants and metal restraining agents, having the formula: Aryl-NH-Aryl, particularly when the aryl groups are themselves substituted, for example with hydroxy, amino and substituted amino groups;

(vi) substituted phenols and, particularly, polyfunctional phenols of formula:

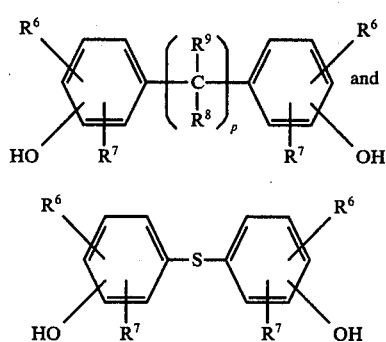

in which $R^6$ and $R^7$ are alkyl groups and $R^8$ and $R^9$ are hydrogen or alkyl substituted with complexing groups such as hydroxy-phenyl. Typical phenols in this class include "Nonox WSP" 2,2′-methylene-bis[4-methyl-6-(1‴-methylcyclohexyl)phenol] of formula:

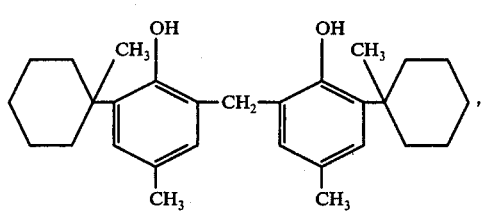

"Topanol CA" [1,1,2-tri-4(2-tertiarybutyl-5-methyl)-phenylpropane] of formula:

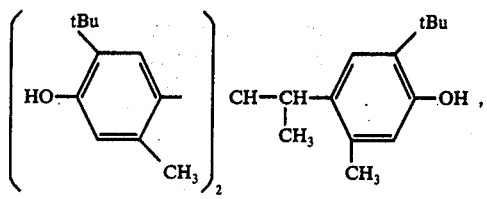

"Irganox 1010" [tetra[-4-(2,6-ditertiarybutyl)phenylethylcarbonyloxymethyl-methane]] of formula:

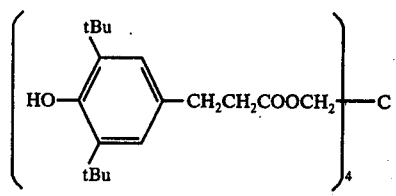

"Antioxidant 2246", "Ionox 330", "Santanox" [4,4′-thio-bis(2-tertiarybutyl-4-methyl)phenol] of formula:

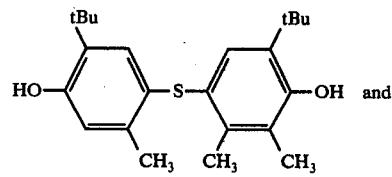

"Antioxidant AC6" [2,2′-thio-bis(4-methyl-6-tertiarybutyl)phenol] of formula:

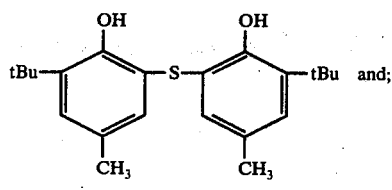

(vii) hydroxy aliphatic carboxylic acids such as citric and tartaric acids.

In the above mentioned complexing agents, it is preferred that the alkyl or alkenyl group contain not more than 6 and preferably not more than 4 carbon atoms, that aryl groups be phenyl and that substituents when present in these groups preferably be halogens such as chloro, $C_1$-$C_6$ alkoxy or a hydroxy or amino group. Such complexes may be preformed before they are added to the thermoplastic polymer, or they may be produced in situ by reaction of a salt of an organo-soluble metal as aforesaid, for example, a carboxylate, with a complexing agent which has already been added to the polymer.

The use of a metal restraining agent in this way offers considerable advantages in some cases where a specified polymer lifetime is required, for example for reusable bottles which require a limited service life under outdoor conditions, or for ropes and twines which are designed to undergo a certain amount of out-door exposure before losing their strength, or for mulching film which is required to survive a specific period of out-door exposure before disintegrating. I have found that it is possible to vary the ultraviolet lifetime of most of the thermoplastic packaging polymers within very wide limits on both sides of the natural lifetime of the commercial polymers by appropriate variation of the concentrations of both the metal salt and the restraining agent. In general, any restraining agent can be used in this way, but those containing sulphur are particularly effective. Specific examples include the zinc, cadmium and lead salts of the dithiocarbamic and dithiophosphoric acids and thiols such as mercaptobenzimidazole.

In some instances, it is desirable to include in the compositions a dyestuff which is sensitive to the chemical conditions prevailing in the polymer at the onset of rapid disintegration of the polymer. The decolourisation or change in colour of the polymer thus indicates in advance when the rapid degradation of the polymer can be expected. Polyconjugated dyestuffs such as $\beta$-carotene and azo dyes have been found to be particularly suitable, but any polymer-soluble dye which is readily destroyed under conditions of autoxidation or in the presence of ultraviolet light is equally suitable so long as it does not screen the ultraviolet light from the polymer.

The following Examples further illustrate the present invention. In all these Examples, spectrophotometric analysis showed that the amount of complex present in the processed polymer was less than 0.1% by weight.

The following Examples illustrate the invention.

EXAMPLES 1-3

Commercial low density polyethylene (100 parts) containing a small amount of a conventional antioxidant incorporated during manufacture was milled at 160°–165° C., and the additives specified below were incorporated. Milling was continued at the same temperature and samples were removed at intervals for determination of the melt viscosity of the polymer in accordance with a standard procedure. After 30 minutes, the polyethylene was removed from the mill and moulded at 160° C., to give thin films (0.008 inch thick). The resulting samples were, at most, pale yellow in colour indicating, as did infra-red spectrophotometry, that at most about 0.1% of complex remained. These films were exposed to a xenon lamp with a spectral energy similar to that of sunlight. The rate of degradation of the polymer was followed by infra-red spectroscopy. The formation of the carbonyl absorption band at 1710 cm$^{-1}$ is related to the loss of physical properties of the film. The ratio of this intensity to the intensity of the absorption band at 1890 cm$^{-1}$, which remains constant during the course of the exposure, gives a measure of the degree of degradation of the polymer.

The following table gives the results obtained during the initial milling of the polymer.

| Additive | Melt flow index of polyethylene on milling at 165° C. after | | | |
|---|---|---|---|---|
| | 0 | 10 | 20 | 30 minutes |
| None | 1.90 | 1.88 | 1.93 | 1.92 |
| Example 1, 0.75 part iron diethyldithiocarbamate | 1.90 | 1.93 | 1.91 | 1.94 |
| Example 2, 0.75 part manganese diethyldithiocarbamate | 1.94 | 1.92 | 1.91 | 1.90 |
| Example 3, 0.75 part zinc dibutyldithiocarbamate + 1.30 parts copper stearate | 1.93 | 1.91 | 1.89 | 1.92 |

These results show that the incorporation of the complexes in accordance with the present invention has little effect on the melt viscosity of the polymer even after fairly long processing at elevated temperature.

The following Table shows the results obtained after exposure of the polymer compositions to the xenon lamp.

| Additive | $\dfrac{a^{1710}\text{cm}^{-1}}{a^{1890}\text{cm}^{-1}}$ after the following hours exposure at 28–30° C. | | | | | | | |
|---|---|---|---|---|---|---|---|---|
| | 0 | 4½ | 22 | 46 | 89 | 105 | 170 | 239 |
| None | 0.60 | 0.70 | 1.20 | 1.50 | 2.40 | 2.50 | 3.27 | 4.30 |
| Example 1 | 0.25 | 0.50 | 2.40 | 4.40 | 6.60 | 7.14 | 10.00 | 11.80 |
| Example 2 | 0.20 | 0.31 | 1.21 | 1.87 | 2.56 | 3.00 | 4.26 | 5.10 |
| Example 3 | 0.43 | — | 0.84 | 1.53 | 2.80 | 3.08 | 4.17 | 5.00 |

The greater speed of degradation of the polymer compositions of the invention, especially that containing iron, is immediately apparent.

EXAMPLE 4

Compositions were prepared as in Examples 1–3 using, per 100 parts polyethylene, the indicated amount of zinc diisopropyldithiophosphate and copper stearate. Films were prepared therefrom and the following results were obtained.

| Additive | Melt flow index of polyethylene on milling at 165° C. after | | | |
|---|---|---|---|---|
| | 0 | 10 | 20 | 30 minutes |
| None | 1.90 | 1.88 | 1.93 | 1.92 |
| Example 4, 1 part zinc diisopropyldithiophosphate + 2.6 parts copper stearate | 1.92 | 1.90 | 1.94 | 1.94 |

These results show again that the complexes have no effect on melt viscosity. The results obtained after exposure to the xenon lamp were as follows:

| Additive | $\dfrac{a^{1710}\text{cm}^{-1}}{a^{1890}\text{cm}^{-1}}$ after the following hours exposure | | | | | | |
|---|---|---|---|---|---|---|---|
| | 0 | 22 | 46 | 89 | 105 | 170 | 239 |
| None | 0.60 | 1.20 | 1.50 | 2.40 | 2.50 | 3.27 | 4.30 |
| Example 4 | 0.50 | 0.70 | 1.12 | 2.00 | 2.50 | 4.05 | 5.87 |

EXAMPLE 5

Commercial Polypropylene (I.C.I. grade LYM42 containing conventional stabilisers) was milled for 10 minutes at 165° C., with the additives specified below incorporated. The films obtained therefrom were exposed to a mercury lamp and the rate of degradation of the polymer was followed by infra-red spectroscopy. the table below gives the additives used, their concentration and the time to embrittlement. At the end of milling, the polymer was coloured no more than pale yellow-brown.

| Additive | Concentration % | Time of embrittlement |
|---|---|---|
| Zn DBC + Fe Stearate | 0.95 1.813 | 150 hours |
| Zn DBC + | 0.0095 | 205 hours |

-continued

| Additive | Concentration % | Time of embrittlement |
|---|---|---|
| Fe DBC | 0.0134 | |
| Fe DBC | 0.0134 | 325 hours |
| No additive | Pressed only | 700 hours |

DBC = dibutyldithiocarbamate

EXAMPLE 6

The polypropylene used in the previous example was mixed with iron diethyldithiocarbamate in a "Buzz-Ko" Kneader and the resulting film which was no more than pale yellow in colour, subject to a black lamp/sunlamp (similar to the Climatest). The results obtained, using different amounts of the additive, are given below.

| Additive Concentration (%) | Time to embrittlement |
|---|---|
| 0.1 | <75 hours |
| 0.01 | <75 hours |
| None | 125 hours |

The rate of disintegration with this lamp was very much more rapid than with the mercury lamp used in the previous Example and disintegration occurred before 75 hours had elapsed in the cases where additive was employed.

EXAMPLE 7

Two types of polystyrene namely (a) Standard clear grade and (b) White pigmented, high impact, grade were subjected to varying amounts of iron diethyl dithiocarbamate by incorporating the additive in a two-roll mill for 10 minutes at 140° C. The samples were then pressed to 0.01" thick film and exposed to a filtered mercury arc lamp. The table below gives the results obtained.

| Additive Concentration (%) | Behaviour of films at given times (in hours) | | | | |
|---|---|---|---|---|---|
| | (a) 492 | 715 | 210 | (b) 400 | 1000 |
| None Pressed only | very slight crazing | crazing | no change | no change | slight |
| milled | | | no change | slight crazing | crazing cracking |
| 0.01 | very slight crazing | crazing | slight crazing | cracking | " |
| 0.05 | crazing | marked crazing | slight crazing | cracking | " |
| 0.10 | crazing | marked crazing | slight crazing | cracking | " |
| 1.0 | very slight crazing | very slight crazing | no change | no change | slight crazing |

It can be seen that in concentrations from 0.01 to 0.1% and short milling times the additive promotes degradation and there is approximately three times the rate over the milled control and five times over the unmilled control. With the 1% sample (but not with any of the others) there was quite deep colouration at the end of milling and the additive was quite ineffective as an activator.

EXAMPLE 8

Various commercial grades of high density polyethylene were mixed by milling for 10 minutes at 145° C. with iron diethyl dithiocarbamate and then pressed at 150°-170° C. to 0.01" thick sheet, which was, at most, pale yellow in colour. The resulting sheets, whose colour increased from almost colourless at 0.01% to deep yellow-brown at 1%, were then exposed in a Geigy (modified Climatest) cabinet. The results obtained are as shown below.

| Polymer Manufacturer | Additive Concn. | Time to Crazing | Disintegration |
|---|---|---|---|
| B.P. | None (Pressed only) | — | 300 |
| | (Milled & pressed) | — | 250 |
| | 0.01 | 100 | 125 |
| | 0.05 | 150 | 175 |
| | 0.10 | 240 | 350 |
| | 1.0 | >425 | >425 |
| Shell | None (Pressed only) | — | 250 |
| | (Milled & Pressed) | — | 175 |
| | 0.01 | 75 | 100 |
| | 0.05 | 125 | 150 |
| | 0.10 | 250 | >450 |
| | 1.00 | >450 | >450 |
| Hoechst | None (Pressed only) | — | 250 |
| | (Milled & Pressed) | 175 | 250 |
| | 0.01 | 100 | 125 |
| | 0.05 | 175 | 250 |
| | 0.10 | 250 | 425 |
| | 1.00 | >450 | >425 |

It can be seen that although different high density polyethylenes differ in their degradability. They all show the ssame relative increase in degradability with change in additive concentration. At the short processing times used, 1% of the iron complex has really no activating effect. The activating effect is achieved at slightly less than 0.1% of the additive and the lowest concentration was the most effective.

EXAMPLE 9

A standard commercial grade of polypropylene used in the manufacture of packaging film was mixed with the following additives in a "Buss-Ko" Kneader. In the table is shown the melt flow index (M.F.I.) of the polymer at 190° C. compared with the control without additive and the time taken for the pressed film (0.01 ins) to disintegrate on exposure in a black lamp/sun lamp accelerated exposure test. Where no M.F.I. figures are given, they are within experimental error the same as the control.

| Compound | M.F.I. | Time (Hrs.) |
|---|---|---|
| None | 1.20 | 120 |
| FeDC (0.005%) | | 95 |
| FeDC (0.01%) | 1.27 | 70 |
| FeDC (0.05%) | 0.94 | 95 |
| FeAc (0.01%) | | 70 |
| FeAc (0.1%) | 1.23 | 100 |
| FeAO (0.05%) | | 70 |

DC = dibutyldithiocarbamate
Ac = Acetylacetone oxime
AO = 2-Hydroxy-4 methylacetophenone

EXAMPLE 10

An identical experiment to Example 9 was carried out except that in each case the restraining agent was added to the "Buss-Ko" Kneader first, followed by the addition of iron as stearate (0.02 m.atoms/100g). When the experiment was carried out in this way, the melt flow index of the polymer after mixing at 170° C. for 10 minutes was substantially the same as the control in all cases.

| Restraining Agent | Conc. m.mols/100g | Time (hrs) |
|---|---|---|
| Salicylaldehyde | 0.06 | 70 |
| Citric acid | 0.02 | 95 |
| Tartaric acid | 0.03 | 75 |
| Acetyl acetone(Ac) | 0.06 | 95 |
| Disalicylidene ethylenediamine | 0.02 | 95 |
| 2-Hydroxy-4-methyl acetophenone oxide (AO) | 0.06 | 90 |
| Ethylenediaminetetra acetic acid (EDTA) | 0.02 | 95 |
| Tetramethylthiuram disulphide (TMTD) | 0.03 | 95 |
| Zinc di-isopropyl dithiophosphate (ZDP) | 0.03 | 95 |
| Bis-di-isopropyl-thiophosphoryl di-sulphide | 0.03 | 70 |
| 2-Mercaptobenzimadazole (MBI) | 0.06 | 95 |
| 2-Mercaptobenzthiazole (MBT) | 0.06 | 70 |
| Trimethylthiourea | 0.06 | 95 |
| Diaminoethane (1,2) | 0.06 | 75 |
| Thiodipropionic acid | 0.06 | 70 |
| Control (no iron) | — | 145 |

EXAMPLE 11

Unstabilised polypropylene was mixed in a "Buss-Ko" Kneader under the conditions of the last example. It was found to be impossible to mix polypropylene and iron stearate even at 0.001 m.g. atoms/100g polypropylene, due to a rapid increase in M.F.I. but when various restraining agents were added first, it was possible to incorporate up to 1 m.g. atom of iron without any appreciable effect on MFI with the agents shown in the following table. The time taken to complete disintegration of polypropylene film is seen to depend primarily on the amount of metal present.

| Restraining Agent | Conc m.mols/100g | Metal ion | Conc m.g. atoms/100g | Time (hrs) |
|---|---|---|---|---|
| Topanol CA | 0.1 | — | — | 120 |
|  | 0.2 | — | — | 120 |
|  | 0.5 | — | — | 140 |
| Topanol CA | 0.1 | Fe | 0.005 | 95 |
|  | 0.2 | Fe | 0.01 | 75 |
|  | 0.1 | Fe | 0.01 | 70 |
|  | 0.5 | Fe | 0.01 | 90 |
|  | 0.5 | Fe | 0.05 | 60 |
|  | 0.5 | Fe | 0.10 | 45 |
|  | 0.5 | Fe | 0.50 | 40 |
|  | 0.5 | Fe | 1.009 | 40 |
|  | 0.5 | Co | 1.00 | 40 |
|  | 0.5 | Ce | 1.00 | 45 |
|  | 0.5 | Mn | 1.00 | 70 |
|  | 0.5 | Cu | 1.00 | 90 |
|  | 0.5 | Cr | 1.00 | 100 |

EXAMPLE 12

Low density polyethylene (MFI 2.56) was compounded on an open two roll mill (friction ratio 1:1) for 10 minutes at 140° C., during which time commercial bis-phenols were added followed by the additives shown in the table. The MFIs after milling, and the time taken to embrittlement compared with the control with restraining agent only is shown. The powerful restraining effect of the dithiocarbamate is evident even under these severe oxidative conditions, but the bis-phenol is also acting as an effective restrainer, whose effectiveness increases with increasing concentration without affecting the photo-activating effect appreciably.

| Phenolic Restrainers | Conc. (%) | Metal compound | Conc. (%) | Time (hrs) | MFI |
|---|---|---|---|---|---|
| Nonox WSP | 0.01 | — | — | >400 | 2.33 |
|  | 0.10 | — | — | >400 | 2.50 |
|  | 0.01 | FeDC | 0.01 | 195 | 2.56 |
|  | 0.01 | FeDC | 0.10 | 205 | 2.53 |
|  | 0.01 | Fe Stearate | 0.01 | 195 | 2.39 |
|  | 0.01 | Fe Stearate | 0.10 | 130 | 2.20 |
|  | 0.01 | Fe Stearate | 0.50 | 90 | 1.81 |
|  | 0.01 | Fe Stearate | 1.00 | 70 | 1.89 |
|  | 0.10 | Fe Stearate | 1.00 | 80 | 2.20 |
| Topanol CA | 0.01 | Fe Stearate | 0.50 | 90 | 2.05 |
| Irganox 1010 | 0.01 | Fe Stearate | 0.50 | 90 | 1.85 |
| Santanox | 0.01 | Fe Stearate | 0.50 | 130 | 2.50 |
|  | 0.10 | Fe Stearate | 0.50 | 195 | 2.56 |
| Bis-(4-tert-octylphenol) sulphide | 0.01 | Fe Stearate | 0.50 | 90 | 2.33 |
|  | 0.10 | Fe Stearate | 0.50 | 185 | 2.54 |

EXAMPLE 13

High density polyethylene stabilised with 0.01% of a poly-phenolic antioxidant (Topanol CA) was open milled at 145° C. for 10 mins, during which time metal stearates were mixed in. Samples of film (0.01 ins thick) were compression moulded at 160° C. and exposed in an accelerated weathering cabinet in the usual way. Up to 0.1% of metal stearates, the MFI remained constant during processing. At higher concentrations some change was observed, but this could be offset by increasing the amount of restrainer. The results obtained are given in the table.

| Metal Stearate | Concentration (%) | Time to embrittlement (hrs) |
|---|---|---|
| Iron | 0.01 | 90 |
|  | 0.10 | 40 |
|  | 0.50 | 35 |
|  | 1.00 | 35 |
| Cobalt | 1.00 | 40 |
| Copper | 1.00 | 110 |
| Manganese | 1.00 | 70 |
| Chromium | 1.00 | 140 |
| Cerium | 1.00 | 35 |
| Control | — | 250 |

EXAMPLE 14

A commercial grade of acrylonitrile butadienestyrene (ABS) co-polymer (Marbon "Cycolac" injection grade) was open milled at 150° C. for 10 minutes during which metal compounds and restraining agents were added. The Table below shows the effect of the iron dithiocarbamate. Iron carboxylates in combination with other restraining agents such as the poly-phenols alone and in combination with dilaurylthiodipropionate, were found to be equally effective. Acceleration ratios of up to three were obtained quite readily although relatively high concentrations of metal compound had to be used. The colour disappeared rapidly during milling.

| Concentration of FeDC | Time to disintegration (O.Olins sheet) |
|---|---|
| No additive | 47 hrs |
| 0.01% | 38 hrs |
| 0.05% | 38 hrs |
| 0.10% | 23 hrs |
| 1.00% | 16 hrs |

EXAMPLE 15

A commercial "high impact" grade of polystyrene containing 6% of polybutadiene and 0.25% of a bisphenol (Topanol CA) was open milled at 140° C. for 10 minutes, during which time the additives shown in the table were introduced. Degradation was effectively restrained during the milling process and sheets (0.01 ins) were compression moulded at 160° C. Times to disintegration are shown in the table.

| Additive | Concentration (%) | Time (hrs) |
|---|---|---|
| None | — | 40 |
| FeDC | 0.01 | 15 |
|  | 0.05 | 23 |
|  | 0.10 | 23 |
| Fe Stearate | 0.01 | 16 |
|  | 0.10 | 16 |
|  | 0.50 | 16 |
|  | 1.00 | 6 |

EXAMPLE 16

A commercial vinyl varnish for metal cans (copolymer of vinyl chloride and vinyl acetate) was stoved onto a metal foil for 10 mins at 154° C. in air after incorporating the additives given in the Table. The additives imparted little or no colour at the concentrations employed. The times taken for the coating to flake off the foil on exposure to a black- lamp/sunlamp U.V. source are given in the table.

| Compound | Concentration (%) | Time (hrs) |
|---|---|---|
| None | — | 145 |
| FeDc | 0.01 | 53 |
| FeDc | 0.05 | 53 |

EXAMPLE 17

A commercial PVC "bottle resin" was blended in a "Buss-Ko" Kneader with iron dibutyl dithiocarbamate at 180° C. at a number of different concentrations and pressed to film at the same temperature. Even at the highest concentration shown below, no extra discolouration was observed over that given by the control. The time taken to physical breakdown compared with the control is shown in the Table.

| Concentration of FeDC(%) | Time to physical breakdown (hrs) |
|---|---|
| None | >2000 |
| 0.01 | 1750 |
| 0.05 | 1900 |
| 0.10 | 2000 |

This result indicates that the rate of breakdown of PVC is accelerated by the iron complex.

EXAMPLE 18

A standard commercial grade of polypropylene was treated in a "Buss-Ko" Kneader under the same conditions as Example 9. A two component system of iron stearate and zinc dibutyl dithiocarbamate was added to the polymer at differing ratios of metal salt to restraining agent. In each case the restraining agent was added to the polymer melt first. In all cases the melt flow index of the polymer mixed for 10 minutes at 170° C. did not differ significantly from that of the polymer containing no additive, and the compression moulded sheets were almost colourless. The Table illustrates the way in which the stability of the plastics can be varied *on both sides* of the lifetime of the commercial polymer on accelerated exposure.

| Concentration of iron Stearate (%) | Concentration of zinc dibutyl dithio-carbamate (%) | Time (hrs) |
|---|---|---|
| — | — | 120 |
| — | 1.00 | 426 |
| 0.01 | 1.00 | 380 |
| 0.05 | 0.50 | 205 |
| 0.05 | 0.10 | 145 |
| 0.10 | 0.10 | 100 |
| 0.50 | 0.10 | 50 |
| 1.00 | 0.10 | 35 |
| 1.00 | 0.05 | 32 |

EXAMPLE 19

A standard commercial grade of polypropylene (film grade) was mixed under the conditions of Example 9 with iron dibutyl dithiocarbamate at the concentrations shown in the table and, in addition, two dyestuffs were added as indicators of degradation. It can be seen that bleaching of the dyes occurred, which provided an early warning of impending degradation about 25% of the total polymer lifetime before the onset of physical disintegration.

| Dyestuff | Conc. (%) | Colour | FeDC conc.(%) | Time taken to the following: Fading | First sign of degradation | Embrittlement |
|---|---|---|---|---|---|---|
| β-Carotene | 0.1 | Yellow | 0.005 | 60 | 83 | 95 |
|  |  | Yellow | 0.01 | 50 | 62 | 70 |
|  |  | Yellow | 0.05 | 65 | 80 | 92 |
|  |  | Yellow | 0.10 | 50 | 70 | 100 |
| Control | 0.1 | Yellow | — | 105 | 125 | 143 |
| Phenyl-azo-β-naphthol | 0.1 | Yellow/Brown | 0.005 | 55 | 80 | 100 |
|  |  | Yellow/Brown | 0.01 | 55 | 85 | 90 |
|  |  | Yellow/Brown | 0.05 | 70 | 90 | 110 |
| Control | 0.1 | Yellow/Brown | — | 140 | 165 | 180 |

EXAMPLE 20

Film grade polyethylene as used in Example 12 was mixed with the additives shown in the Table under the same conditions as Example 12. In no case was there any significant effect on the MFI of the polymer after 10 minutes milling. The change in carbonyl index ($\alpha^{1710cm^{-1}}/\alpha^{1890\ cm^{-1}}$) after exposure to a black-lamp-/sunlamp accelerated U.V. exposure assembly after different times is shown in the Table. It can be seen that the iron and cerium complexes appear to give the most active photoinitiating systems. The nickel and cobalt complexes were quite ineffective at this concentration.

| Metal complex | | Conc. (%) | Time taken to carbonyl index of hrs | | |
|---|---|---|---|---|---|
| | | | 10 | 20 | 30 |
| Salicylaldehyde | Fe(III) | 0.05 | 95 | 150 | 185 |
| | Co(II) | 0.05 | 420 | >450 | >450 |
| | Ni(II) | 0.05 | 450 | >450 | >450 |
| | Cu(II) | | 155 | 420 | >450 |
| | Mn(III) | 0.05 | 130 | 200 | 235 |
| | Cr(III) | | 160 | 410 | >450 |
| | Ce(III) | | 98 | 163 | 205 |
| Disalicylidene ethylene diamine | Fe(III) | 0.05 | 145 | 165 | 185 |
| | Cu(II) | 0.05 | 325 | 450 | 450 |
| | Mn(III) | 0.05 | 115 | 180 | 205 |
| | Ce(III) | 0.05 | 160 | 185 | 210 |
| 2-Hydroxy-4-methyl acetophenone oxime | Fe(III) | 0.05 | 115 | 173 | 201 |
| 2-Hydroxy-phenylbenz-triazole | Fe(III) | 0.05 | 150 | 195 | 320 |

EXAMPLE 21

Commercial low density polyethylene was masterbatched with iron dibutyl dithiocarbamate and the resulting masterbatch was blended with the same low density polyethylene to give initial concentrations of 0.05 and 0.1% and the polymers were then blown into film of 60 mµ thickness. The samples were exposed out of doors in South Africa and both chemical and physical tests were carried out in samples at intervals. The yield and % elongation at constant draw speed for the control sample without additive and for the two samples containing additive are shown in the Tables for 6 weeks and 8 weeks exposure. It is clear from the Tables that very little change occurs under the conditions of this evaluation for about four weeks, followed by a rapid degradation of the film after this. During this period, the control film shows relatively little change in physical properties. The actual number of hours of sunshine during this period was 410 hours.

| FeDC conc. | Time | % Elongation at break (transverse direction) at draw speed 200mm/min) | | | |
|---|---|---|---|---|---|
| | | 0 weeks | 4 weeks | 8 weeks | 10 weeks |
| — | | 545 | 530 | 420 | 525 |
| 0.05 | | 505 | 380 | 83 | 35 |
| 0.10 | | 500 | 460 | 78 | 38 (friable) |
| | | Yield/Cross sectional area | | | |
| — | | 65.3 | 66.7 | 59.2 | |
| 0.05 | | 65.0 | 71.1 | 88.0 | |
| 0.10 | | 66.6 | 65.9 | 90.0 | |
| | | Weight increase due to oxidation (%) | | | |
| — | | 0.005 | 0.035 | 0.063 | |
| 0.05 | | — | 0.263 | 0.384 | |
| 0.10 | | — | 0.250 | 0.543 | |

I claim:

1. In a plastics composition which comprises a thermoplastic homopolymer or copolymer of a vinyl monomer or mixture thereof the improvement wherein it also contains at least one non-ionic organo-soluble antioxidant complex of a chain-breaking, peroxide-decomposing, metal ion deactivating or ultra-violet light stabilising compound selected from the group consisting of an aryl-amine, a phenol and a trivalent phosphorus antioxidant and a metal selected from iron, silver, palladium, molybdenum, chromium, tungsten or cerium in an amount such as to cause degradation of the pastics composition at the end of the desired life of the composition, said amount being from about 0.001% to about 0.1% by weight based on the weight of the polymer.

2. A composition according to claim 1 in which the metal is iron.

3. A composition according to claim 1 in which the complex is present in an amount up to 0.09% by weight based on the weight of the polymer.

4. A composition according to claim 3 in which the complex is present in an amount up to 0.05% by weight based on the weight of the polymer.

5. A composition according to claim 4 in which the complex containing a ligand oxygen atom directly attached to an aryl radical is derived from a bis-phenol, phenol oxime, phenol-immine, phenol aldehyde or phenol ketone.

6. A composition according to claim 5 in which the complex is derived from a polyfunctional phenol of the formula:

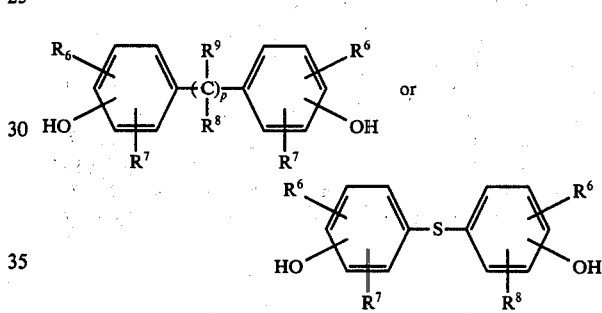

wherein $R^6$ and $R^7$ represent alkyl groups and $R^8$ and $R^9$ represent hydrogen or an alkyl group substituted by a hydroxyphenol group, and $p$ represents a positive integer.

7. A composition according to claim 6 in which the complex is a 2,2'-methylene-bis[4-methyl-6-(1'''-methyl-cyclohexyl)phenol], 1,1,2-tri-4(2-tertiarybutyl-5-methyl)phenyl-propane,tetra-[4-(2,6-ditertiary butyl)-phenyl]-ethylcarbonyloxymethyl methane, 4,4'-thio-bis(2-tertiarybutyl-4-methyl)phenol or 2,2'-thio-bis(4-methyl-6-tertiarybutyl) phenol complex.

8. A composition according to claim 1 which also contains a dyestuff which is sensitive to the chemical conditions prevailing in the composition at the onset of degradation of the polymer.

9. A composition according to claim 8 in which the dyestuff is β-carotene or phenyl-azo-62 -naphthol.

10. A composition according to claim 1 in the form of a container, film of fibre.

11. In a plastics composition which comprises a thermoplastic homopolymer or copolymer of a vinyl monomer or misture thereof the improvement wherein it also contains at least one non-ionic organo-soluble anti-oxidant complex of a chain-breaking, peroxide-decomposing, metal ion eeactivating or ultra-violet light stabilizing compound and a metal selected from iron, silver, palladium, molybdenum, chromium, tungsten or cerium in an amount such as to cause degradation of the plastics composition at the end of the desired life of the composition, said amount being from about 0.001% to about 0.1% by weight based on the weight of the polymer wherein said complex is a tetramethylthiuram disulphide, a di-isopropylthiophosphoryl disulphide or trimethylthiourea complex.

12. In a plastics composition which comprises a thermoplastic homopolymer or copolymer of a vinyl monomer or mixture thereof the improvement wherein it also contains at least one non-ionic organo-soluble anti-oxidant complex of a chain-breaking, peroxide-decomposing, metal ion deactivating or ultra-violet light stabilizing compound and a metal selected from iron, silver, palladium, molybdenum, chromium, tungsten or cerium in an amount such as to cause degradation of the plastics composition at the end of the desired life of the composition, said amount being from about 0.001% to about 0.1% by weight based on the weight based on the weight of the polymer; wherein said complex is derived from a compound of the formula:

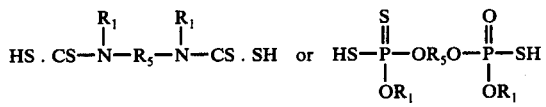

wherein $R_1$ is as defined in claim 8 and $R_5$ represents a divalent aliphatic, aromatic or heterocyclic radical.

13. In a plastics composition which comprises a thermoplastic homopolymer or copolymer of a vinyl monomer or mixture thereof the improvement wherein it also contains at least one nonionic organo-soluble antioxidant complex of a chaing-breaking, peroxide-decomposing, metal ion deactivating or ultra-violet light stabilizing compound and a metal selected from iron, silver, palladium, molybdenum, chromium, tungsten or cerium in an amount such as to cause degradation of the plastics composition at the end of the desired life of the composition, said amount being from about 0.001% to about 0.1% by weight based on the weight of the polymer; wherein said complex is derived from a compound of the formula:

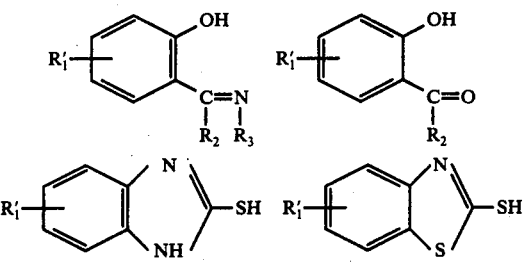

wherein $R_1$ represents an alkyl, substituted alkyl, hydroxy or chloro group, or an alkylene radical linking two such aromatic groups, $R_2$ represents hydrogen or a substituted or unsubstituted alkyl or aryl group and $R_3$ represents a hydroxy, alkoxy, alkyl or substituted alkyl group or a divalent alkyl radical linking two such aromatic groups.

14. A composition according to claim 13 in which the complex is salicylaldehyde, di(salicylidene)ethylene diamine, 4-methyl-2-hydroxy-acetophenone oxime, mercaptobenzthiazole or mercaptobenzimidazole complex.

* * * * *